Patented Sept. 24, 1935

2,015,406

UNITED STATES PATENT OFFICE 2,015,406

GENERATION OF TOXIC GAS

Paul L. Magill, Joseph W. Dunning, and Ivan L. Ressler, Niagara Falls, N. Y., assignors to E. I. du Pont de Nemours & Company, Inc., Wilmington, Del., a corporation of Delaware No Drawing. Application May 18, 1932, Serial No. 612,151

7 Claims. (Cl. 167—35)

This invention relates to a solid fumigant material and more particularly to a fumigant material which is capable of reacting with water to liberate hydrocyanic acid in toxic concentrations.

A common method of fumigating consists in reacting an alkali metal cyanide with acid at the point of fumigation to liberate hydrocyanic acid. This method is undesirable because of spattering or spilling of corrosive acid and the difficulty of handling acid residues. In many cases it is replaced by the more expensive method consisting in liberating liquid hydrocyanic acid at the point of fumigation. Liquid hydrocyanic acid is relatively dangerous and inconvenient to transport and handle and requires special equipment when used as a fumigant. It has been proposed to overcome these disadvantages by reacting together at the point of fumigation an alkali metal cyanide, water, and a salt having a relatively high heat of hydration, the base of which salt forms an unstable cyanide. As an example of this method, sodium cyanide and anhydrous aluminum sulfate may be reacted in the presence of water to liberate hydrocyanic acid, as shown in U. S. Patent 1,497,690. The reaction probably occurs as follows:

$$6NaCN + Al_2(SO_4)_3 + 16H_2O \rightarrow 3Na_2SO_4 \cdot 10H_2O + 2Al(OH)_3 + 6HCN$$

We now have discovered that this process of generation of HCN from NaCN can be improved. When operating this method we have found a tendency to excessive foaming of the reactants. Further, the caked residue is hard and tough, making it difficult to remove. This tendency of the residue to harden also delays the reaction and often prevents complete reaction so that relatively large amounts of cyanide may remain in the residue, and prevents the escape of all the hydrocyanic acid formed.

The object of this invention is to provide a method of, and a composition of matter for generating hydrocyanic acid, wherein suitable substances are reacted with water to generate hydrocyanic acid in toxic concentrations without undue foaming and leaving a substantially dry, friable residue, which is easily removed from the reaction container. A further object is to provide such a method in which a cyanide is substantially completely reacted to form hydrocyanic acid which is substantially completely evolved from the mixture.

These objects may be accomplished by mixing together water, metal cyanide, one or more salts having relatively high heats of hydration and whose bases form unstable cyanides (hereinafter called "generating salts"), materials which inhibit foaming of the reaction and a solid material which is inert to the cyanide reaction.

We have discovered that when hydrocyanic acid is generated by adding water to alkali metal cyanide or other metal cyanide and a "generating salt", i. e., a salt whose base forms an unstable cyanide, in the presence of certain materials hereinafter termed "residue conditioners", the residue formed is substantially dry, and friable, and may be easily removed from the reaction container. These "residue conditioners" are pulverulent, solid substances which are inert to the cyanide reaction. Materials which we have found suitable as residue conditioners include chalk, talc, a type of kieselguhr known as "sil-o-cel", wheat bran, starchy material such as wheat flour, and cellulosic material, for instance sawdust. Obviously, many other inert materials are suitable for our invention. The amount of residue conditioner required depends on the result desired, since an increase in the amount of conditioner in general increases the softness and friability of the resulting residue. I have obtained good results by adding the residue conditioner in amounts from 2% to 20% of the total weight of the non-aqueous reacting materials.

We have further discovered that certain substances when present in the reaction mixture greatly inhibit foaming. A great number of substances have heretofore been used for the prevention of foaming in chemical reactions but many of them do not prevent foaming in the herein described cyanide reaction. We have found that foaming of this reaction may be inhibited by the addition of small amounts of a liquid hydrocarbon, for instance kerosene or a light lubricating oil, or by a lower alcohol, for instance, methanol, isopropyl alcohol, normal butyl alcohol, or amyl alcohol. The foam inhibitor may be added to the solid reactants before reacting with water, or it may be added simultaneously with the water at the time of reaction. If an alcohol is used as foam inhibitor, it conveniently may be dissolved in the water used for the reaction. In most cases we have found 1% to 2% of the foam inhibitor sufficient to prevent undue foaming. Our invention, however, is not limited to these proportions; larger amounts may be used if it is desired further to reduce foaming. It is preferable, however, not to use so much foam inhibitor that it will materially change the physical characteristics of the solid ingredients by wetting.

The herein described residue conditioners also inhibit foaming of the reaction to some extent, so that it may be practicable in some cases to omit the liquid foam inhibitors. However, we prefer to use both liquid foam inhibitor and solid residue conditioner.

To generate hydrocyanic acid according to our invention, a metal cyanide, a salt whose base forms an unstable cyanide, and a residue conditioner, with or without a foam inhibitor as herein described, are simultaneously treated with water in any convenient manner. We prefer first to prepare a pulverulent mixture of the non-aqueous ingredients and treat the mixture with water. It is preferable to so adjust the relative amounts of water, residue conditioner and generating salt that the resulting residue will be slightly moist, since a residue containing no free water is more difficult to remove from the reaction container, although it is superior in this respect to the hard residues produced by prior methods. The optimum proportion of water may be estimated by calculation and more exactly determined by trial.

The "generating salt" is preferably one which also has a relatively high heat of hydration and is preferably used in its anhydrous form. Sulphates and chlorides of aluminum and magnesium are examples of salts especially suitable for this purpose. Dehydrated aluminum sulfate suitable for use in our invention may be made from the ordinary hydrated salt by heating the salt in a vacuum pan dryer until about half the water is removed and then completing the dehydration by heating in shallow pans open to the atmosphere. The vacuum pan dryer is preferably operated with a shelf temperature of about 110° C. and under a vacuum of about 28 inches of mercury less than atmospheric pressure.

We prefer to use an excess of 25–50% of the "generating salt" over that required to react with the cyanide, in order to insure substantially complete HCN evolution. If smaller quantities are used, the reaction tends to be incomplete; there is little or no practical advantage in using more than a 50% excess of the generating salt.

In order to obtain the maximum generation of hydrocyanic acid, the water is preferably added as rapidly as possible to the pulverulent mass, so as to obtain some agitation by the action of the stream of water entering the reaction container. Practically any water-tight container may be used as reaction vessel; for instance, we have found an ordinary galvanized iron can of several gallons capacity suitable for this purpose.

*Example*

A pulverulent mixture of 1 mole. of sodium cyanide and 1.5 mole. of anhydrous aluminum sulfate was treated with 0.8 cc. of water per gram of mixture. After the evolution of gas was complete a hard crystalline cake of residue remained in the reaction container.

To a second portion of the mixture, 5% by weight of "sil-o-cel" was added and the resulting mixture was treated with water as above described. The resulting residue was less dense, considerably softer and more easily broken up and removed from the container.

Although, for the purpose of illustrating our invention we have given an example wherein sodium cyanide is used as the source of hydrocyanic acid, it is understood that other metal cyanides also may be used. For instance, we have found that the sodium cyanide may be replaced by calcium cyanide with good results.

Pulverulent mixtures may be made according to our invention which are sufficiently reactive to liberate hydrocyanic acid in toxic concentrations when brought into contact with the moisture of the air. Hence, it is possible to use such mixtures as fumigants by simply spreading them out in thin layers in the place it is desired to fumigate. When our fumigant is to be used this way it is preferable that the generating salt be one which has a relatively high heat of hydration, is in its anhydrous form, and is more or less deliquescent. For this type of fumigation the foam inhibitor may be omitted if desired. We have found that a mixture containing an hydrous aluminum sulphate, as illustrated in the example, is suitable for this kind of fumigation.

The generation of hydrocyanic acid according to our invention is less expensive, less hazardous, and more convenient than the use of liquid hydrocyanic acid. It does not employ acid or other corrosive materials and hence causes no damage to premises to be fumigated and does not require acid resistant equipment. The residue remaining is substantially non-toxic, non-corrosive, and is relatively easily removed from the reaction containers and otherwise handled.

We claim:

1. A process for the generation of hydrocyanic acid comprising mixing together water, metal cyanide, a metal salt the base of which forms an unstable cyanide and a pulverulent solid inert material adapted to promote the formation of a relatively soft, friable, solid residue.

2. A process for the generation of hydrocyanic acid comprising mixing together water, alkali metal cyanide, a metal salt the base of which forms an unstable cyanide, a foam inhibitor comprising a substance selected from the group consisting of liquid hydrocarbons and lower aliphatic alcohols and a pulverulent solid inert material adapted to promote the formation of a relatively soft, friable, solid residue.

3. A process for the generation of hydrocyanic acid comprising exposing to atmospheric moisture a mixture comprising sodium cyanide, anhydrous aluminum sulfate and a pulverulent solid inert material adapted to promote the formation of a relatively soft, friable, solid residue.

4. A composition of matter comprising metal cyanide, a metal salt the base of which forms an unstable cyanide, and a pulverulent solid inert material adapted to promote the formation of a relatively soft, friable, solid residue.

5. A composition of matter comprising alkali metal cyanide, a metal salt the base of which forms an unstable cyanide, a foam inhibitor comprising a substance selected from the group consisting of liquid hydrocarbons and lower aliphatic alcohols and a pulverulent solid inert material adapted to promote the formation of a relatively soft, friable, solid residue.

6. A composition of matter comprising alkali metal cyanide, anhydrous aluminum sulfate, a liquid hydrocarbon and a pulverulent solid inert material adapted to promote the formation of a relatively soft, friable, solid residue.

7. A composition of matter comprising sodium cyanide, anhydrous aluminum sulfate, 1 to 2% by weight of kerosene, and a pulverulent solid inert material adapted to promote the formation of a relatively soft, friable, solid residue.

PAUL L. MAGILL.
JOSEPH W. DUNNING.
IVAN L. RESSLER.